United States Patent
Kadah et al.

(10) Patent No.: US 9,500,366 B2
(45) Date of Patent: Nov. 22, 2016

(54) FURNACE CONTROL WITH SAFETY CIRCUIT AND NON-VOLATILE MEMORY

(71) Applicants: Andrew S. Kadah, Manlius, NY (US); Weidong Pan, Morganville, NJ (US); Benjamin A. Freer, Syracuse, NY (US)

(72) Inventors: Andrew S. Kadah, Manlius, NY (US); Weidong Pan, Morganville, NJ (US); Benjamin A. Freer, Syracuse, NY (US)

(73) Assignee: International Controls and Measurements Corp., North Syracuse, NY (US)

( * ) Notice: Subject to any disclaimer, the term of this patent is extended or adjusted under 35 U.S.C. 154(b) by 595 days.

(21) Appl. No.: 14/097,978

(22) Filed: Dec. 5, 2013

(65) Prior Publication Data

US 2015/0159887 A1  Jun. 11, 2015

(51) Int. Cl.
| | | |
|---|---|---|
| *F23Q 7/24* | (2006.01) | |
| *F24D 19/10* | (2006.01) | |
| *F24D 5/02* | (2006.01) | |
| *G05B 15/02* | (2006.01) | |
| *F23N 5/24* | (2006.01) | |
| *F27B 9/40* | (2006.01) | |

(52) U.S. Cl.
CPC .............. *F23Q 7/24* (2013.01); *F23N 5/242* (2013.01); *F24D 5/02* (2013.01); *F24D 19/1084* (2013.01); *F27B 9/40* (2013.01); *G05B 15/02* (2013.01); *F23N 2023/04* (2013.01); *F23N 2023/08* (2013.01); *F23N 2025/04* (2013.01); *F23N 2025/08* (2013.01); *F23N 2031/10* (2013.01); *F23N 2031/20* (2013.01)

(58) Field of Classification Search
CPC ........ F23N 1/002; F23N 5/242; F23N 5/265; F23N 2023/04; F23N 2023/08; F23N 2023/54; F23N 2025/04; F23N 2025/08; F23N 2027/02; F23N 2027/16; F23N 2031/10; F23N 2031/20; F23Q 7/24; F27D 19/00; F27D 21/00; F27B 9/40; G05B 15/02
See application file for complete search history.

(56) References Cited

U.S. PATENT DOCUMENTS

| | | | | |
|---|---|---|---|---|
| 4,982,721 A | * | 1/1991 | Lynch | F23N 1/022 126/116 A |
| 5,372,120 A | | 12/1994 | Swilik, Jr. et al. | |
| 5,648,722 A | | 7/1997 | Merry et al. | |
| 5,984,003 A | | 11/1999 | Butler | |
| 6,535,838 B2 | * | 3/2003 | Abraham | F23N 1/002 702/183 |
| 6,658,372 B2 | * | 12/2003 | Abraham | F23N 1/002 702/183 |
| 7,299,111 B2 | | 11/2007 | Harrod | |
| 2004/0217182 A1 | * | 11/2004 | St. Jean | F23Q 7/24 237/2 A |
| 2004/0220777 A1 | * | 11/2004 | St. Jean | F23Q 7/24 702/185 |
| 2004/0230402 A1 | * | 11/2004 | St. Jean | F23Q 7/24 702/189 |
| 2011/0125328 A1 | * | 5/2011 | Lingrey | G05B 15/02 700/276 |

* cited by examiner

*Primary Examiner* — Crystal J Barnes-Bullock
(74) *Attorney, Agent, or Firm* — Bernhard P. Molldrem, Jr.

(57) ABSTRACT

A furnace controller circuit includes a microprocessor with input ports and output ports including ports to issue control signals for actuation of inducer, gas burner, and furnace blower. A temperature-actuated limit switch commences a furnace shut-down sequence when the temperature of the furnace heat exchanger exceeds a predetermined limit temperature, and then resets to permit a turn-on sequence. An LED visible fault indicator is coupled to the microprocessor to provide visible fault messages. A non-volatile memory device coupled with the microprocessor is operative to store fault indications when present. In the event of power restoration after power failure, the limit switch status and other fault status are maintained. A lockout period is computed based on length of furnace run time until fault and recent fault history. Limit switch and other safety faults are recorded and these can be weighted and ranked based on age of each fault occurrence. The stored fault data can be used to identify erratic furnace operations, such as short cycling.

14 Claims, 6 Drawing Sheets

FURNACE CONTROL WITH SAFETY CIRCUIT AND NON-VOLATILE MEMORY

BACKGROUND OF THE INVENTION

The present invention relates to commercial and/or residential heating and/or cooling systems and other indoor comfort systems, and is more particularly concerned with a furnace control circuit for a forced-air furnace. The invention is more specifically directed to safety features in a furnace control system which respond to possible malfunctions such as a fault condition of a blower or of an inducer.

Forced air furnaces, e.g., gas-fired furnaces, cycle on when the associated thermostat sends a call for heat, and then cycle off when the thermostat is satisfied, so as to maintain the temperature in a desired range within an occupied comfort space.

Whenever the thermostat senses that the temperature is below a set point, the thermostat closes to supply thermostat power to the furnace controller, which in turn commences a heat cycle. Typically, this turns on the inducer blower to induce a flow of combustion air through the furnace heat exchanger. Then a gas valve is opened, and an igniter is actuated. A flame sense device, e.g., a flame rectification probe, senses flame presence, and if flame is proved, a blower delay timer is started. After a predetermined blower delay time, e.g., twenty seconds, the main blower is powered up to force comfort air through the furnace heat exchanger, and supply it through ductwork to the comfort space. When the heated comfort air has sufficiently warmed the comfort space above a thermostat set point, the thermostat opens and cuts off thermostat power to the controller circuit. When this occurs, the gas valve, main blower and inducer follow a shut-off sequence, and the furnace shuts off until a subsequent call for heat.

In some cases, air flow through the forced-air ductwork may become obstructed, such that there is insufficient flow of comfort air through the furnace to pick up the combustion heat in the heat exchanger. A similar condition may occur if the main blower fails to function properly. When this occurs, a temperature sensor in the furnace detects an overheat condition and causes a limit switch to open to cut off thermostat power to the furnace controller and shut the furnace down. In some cases the limit switch must be reset manually, but in some furnace designs, the limit switch may reset automatically after a predetermined delay time sufficient for the furnace to cool. Then, when there is another call for heat, the furnace will undergo another heating cycle and remain on until either the thermostat is satisfied or the limit switch opens again. In systems of this type, unless the obstruction or other problem is cleared, the limit switch will continue to turn the furnace off shortly after it turns on, resulting in a persistent series of unusually short cycles.

In the now-available furnace controllers, there is no functionality provided to track whether a safety limit switch demonstrates a dangerous pattern of excessive cycling or erratic behavior. Moreover, the available furnace controllers do not include any non-volatile or persistent memory device, and any fault indication or other status indication will be lost whenever power is lost to the furnace controller. Forced-air furnaces are required to include a blower-door safety switch that cuts off power if the door to the furnace blower is opened for any reason. All fuel-fired appliances are required to have a door switch to prevent operation of the appliance with the service panel door open. When this happens, the power to the electronics in the furnace controller is also lost, and the microcontroller of the furnace controller loses memory of any information gathered. The current approach to this problem is for the furnace technician to write down the furnace status indications that appear on the furnace controller before opening the blower door, or before otherwise cutting off furnace power. A sight glass is typically provide in the service panel, to allow the service technician to view an LED indicator through the sight glass before opening the panel. However if the sight glass is dirty, the technician cannot see the diagnostic LED indicator. When this is the case, the technician opens the service panel door to get a clear view, and in doing so the door switch opens, power is interrupted and the fault information is lost. It is possible to incorporate a permanent memory feature in the furnace controller circuit so that it retains fault status in the event of a power interruption.

Moreover, if power is interrupted, the lockout state will be cleared when the microprocessor loses power. Then when power is restored, the furnace will be immediately ready to run again, regardless of whether the problem causing the lockout has itself been cleared. This can create an unsafe condition when the controller locks out the furnace but the homeowner resets the power, or when a power outage occurs and the furnace operates again in an overheated condition when power is restored.

It is common for furnace controls to monitor the state of the furnace limit switch, i.e., the temperature sensitive switch on the furnace heat exchanger that opens in the event the heat exchanger temperature exceeds a limit temperature. The limit temperature indicates a fault in the heat exchanger or the ductwork, or may result from inadequate flow of the return air through the fan and filter. When the limit switch opens, the furnace goes through a shut-down cycle and remains off at least for the time the limit switch is open. The limit switch remains open for some fixed, predetermined period, e.g., three minutes. Some furnace controllers monitor the limit switch condition, and if the limit switch opens again after it has reset, software in the controller may lock out furnace operation for some longer, but fixed period of time, e.g., three hours. After the lockout time has expired, as long as there is a call for heat, the furnace will undergo an ignition sequence and again commence supplying heat to the comfort space. Because the conventional furnace controllers only monitor whether faults have occurred, and not the timing of them, they do not adjust the lock-down period to the seriousness of the problem that caused the limit switch to open. A condition that causes the limit switch to open after only a few minutes of furnace operation would be much more serious than a condition that does not result in overheat until after an hour or more. Likewise, temperature faults that occur weeks apart are less significant than temperature faults occurring at much closer intervals. However, because existing furnace controllers do not store the time of occurrence of a temperature fault, they lack the flexibility to match any lock-out period to the seriousness of the problem.

Some modern furnace controllers use an LED to indicate fault problems when they exist, displaying a flash code to indicate the nature of the fault that has occurred. For example, the furnace controller may store the five most recent faults, e.g., temperature fault, pressure fault, flame presence fault, etc. The service technician uses a pushbutton on the controller to browse through the fault codes, one at a time. That is, the furnace controller stores a number of fault messages in memory, and the same controller provides a mechanism for retrieving and displaying the messages, such as using a pushbutton and an LED to blink a flash code that represents the fault message. When the service technician wants to review the messages, he or she presses or taps the pushbutton once, and the LED flashes the first fault message. Then the technician presses the pushbutton again and the LED flashes the second fault message. The technician continues to tap the pushbutton to scroll or browse through the remaining fault messages, one at a time. A problem that comes with this message browsing is that the technician can easily lose track of how many times he or she has pressed the pushbutton, and does not know which message is being displayed. Then if the technician wants to know the content of the fourth message, for example, he or she will have to return to the beginning of the messages and very carefully tap the pushbutton four times. Even then, the technician cannot be certain that the fault message that flashes is the same one that the technician wanted to see. Thus, a need exists for a furnace controller that allows the service technician to view each specific fault message by tapping a simple pattern of taps onto the pushbutton.

Another limitation on now-available furnace controllers is that although they may store a history of operating faults of the HVAC system, they do not record both the type of fault and when it was that each fault occurred. A fault that occurred weeks before would not be particularly relevant to the operation of the furnace, whereas a more recent fault would be much more likely to be the result of a problem or defect in the HVAC system. Unfortunately, the person reviewing the fault history stored on the furnace controller would have no way of knowing when any given fault might have occurred, or the present significance of the fault.

Currently, the furnace controller may store five or more faults in memory, and the controller retrieves and displays the fault history, typically with a pushbutton and LED to blink a flash code. When the service technician wants to review the fault history, he or she presses or taps on the pushbutton. Pressing the button once results in the LED blinking a flash code for the most recent fault; pressing the button again produces the flash code for the second most recent fault, and so forth for the remaining faults stored in memory. Then if the pushbutton is held down for some longer time, such as ten seconds, the fault history is cleared from memory.

As stated above, the service technician will have no way of knowing when any of these faults actually occurred. Often, the technician will lack the patience to browse carefully through all the fault codes, and may not be able to find all the faults. The technician will not know which of these faults in the fault history are actually useful.

For these reasons, a simple list of recorded furnace operating faults, even when in chronological order, does not provide the technician with sufficient information to carry out repair or maintenance tasks effectively.

OBJECTS AND SUMMARY OF THE INVENTION

Accordingly, it is an object of the present invention to provide improvements to a furnace controller and safety features that overcome the above-mentioned drawback(s) of the prior art.

It is another object to provide an effective arrangement for storing and retaining fault information in the furnace controller circuitry, so that a service technician can make repairs or adjust equipment based on the history of furnace actions and furnace operations.

It is a yet further object for the furnace controller circuit to employ both fault type and time of fault information to permit meaningful analysis of furnace operation and to distinguish between normal furnace operations and potentially unsafe furnace conditions. Time may be reckoned in terms of the number of furnace operations rather than clock time. This invention recognizes the advantage to identifying not only diagnostic issues, but also unsafe operations.

It is still another object to provide the furnace controller with improved functionalities for monitoring limit switch status, especially when the furnace has more than one limit switch.

It is a yet further objective to provide functionalities for roll-out switch monitoring, igniter monitoring, flame-rod monitoring, blower motor monitoring, inducer motor monitoring, gas valve response and monitoring, line voltage monitoring to include quality, integrity, and amplitude of line power, transformer secondary power monitoring, also for quality, integrity, and amplitude, with LED indicator status being retained in non-volatile memory, and with furnace component performance monitoring.

In accordance with an aspect of the present invention, a gas furnace or other fuel-fed furnace has a burner supplied with fuel gas or other fuel and a produces a flame. The flame passes through a combustion air path in the furnace heat exchanger, leaving to an exhaust vent. An inducer fan is employed in many types of these furnaces to induce the flow of combustion air. A blower forces a flow of air that is returned from a comfort space through a comfort air path of the heat exchanger, and the heated air passes from there through HVAC ductwork, supplying heated air to the comfort space. A controller circuit actuates the burner, the inducer, and the blower in a programmed manner so as to effect a turn-on sequence in response to a call for heat from the room thermostat. When the thermostat is satisfied, the controller effects a shut down sequence. The controller circuit includes a microprocessor with a number of input ports and output ports. One or more of these ports are employed to issue control signals for actuation of the burner, the inducer, and the blower.

There may be one or more temperature actuated limit switch(es) effective to commence a shut-down sequence when the temperature of the heat exchanger exceeds a predetermined or preset limit temperature. The limit switch resets after some time period (e.g., three to five minutes) to permit a turn-on sequence after that shut-down sequence.

A visible fault indicator (typically a flashing LED indicator) is coupled to one of the outputs of the microprocessor and is operative to provide a visible fault indication after the microprocessor ascertains that the limit switch has been actuated.

In this invention, the furnace controller further comprises a non-volatile memory device coupled with the microprocessor. The non-volatile memory device is operative to store at least the noted fault indication when a fault indication is present, so that if furnace power is interrupted, the fault indication will be stored and not lost, and will be presented again once power is restored. The non-volatile memory also enables the furnace controller to track and monitor various other functions of the furnace, and store history of events such as limit switch actuation. Other furnace components may be monitored as well and associated faults can be stored in the non-volatile memory, and retrieved by the furnace technician if service is needed. This may include information such as flame quality, power quality, amplitude, and integrity, both for the line voltage and for transformer secondary, or thermostat voltage. Other important furnace parameters may be monitored and their operating history may be stored as well in the non-volatile memory device.

The microprocessor of the controller circuit will process the data stored in the non-volatile memory. After the microprocessor analyses the fault history, the microprocessor can annunciate the diagnosis. On a practical furnace controller, this can involve providing a predetermined pattern of flashes of the LED indicator. In some modern controllers, there may be a liquid crystal display or LCD with a text indication.

For example, if a limit switch fault occurs, this is saved to an EEPROM or other non-volatile memory device, together with the run time prior to occurrence of the fault. This creates a history of the total run time plus reason for the fault. If, after a series of operations, the history shows a series of consequential shutdowns due to limit switch fault, and these occur at very short intervals, e.g., five minutes apart, without any normal long run-time call in between, the microprocessor software or firmware can rank the type of fault for priority of service attention.

This capability extends beyond furnace controllers of course, to any HVAC device with a safety switch, e.g., air flow switch, flame sense switch, overpressure switch, etc. and where there is a pattern of shutdowns due to the same fault type, occurring a few minutes apart, and without any intervening long run time. In each such case, the controller can diagnose the fault and provide an annunciation for the repair technician. These features of fault data saving combined with data analysis and fault diagnosis annunciation, after data saving, have never been available on any furnace controller or on any other HVAC controller circuit.

Stated generally, the HVAC equipment may employ any source of a heated or chilled medium, with a heat exchanger that the heated or chilled medium passes through, and in which a blower forces a flow of return air from a comfort space through a comfort air path in the heat exchanger, and from there through ductwork to supply the heated or chilled air to the comfort space. The HVAC equipment employs a controller circuit or controller board that is coupled to a source of AC power and which controllably actuates the source of heated or chilled medium and blower to effect a turn-on sequence in response to a call for heat or cooling from an associated thermostat. The controller circuit is also effective to commence a shut down sequence when the call for heat or cooling is satisfied. The controller circuit has a microprocessor in which there are input ports and output ports, including ports to issue control signals for actuation of source of heated or chilled medium and the blower A fault-actuated safety switch in the HVAC equipment is effective to commence the shut-down sequence when a safety parameter in said HVAC equipment exceeds some predetermined limit value. The safety switch may be operative to reset so as to permit the turn-on sequence at some delay period after the shut-down sequence. A visible fault indicator, e.g., a flashing LED or an LCD screen, is coupled to one of the outputs of the microprocessor and is operative to provide a visible fault indication in response to actuation of the safety switch.

As with the embodiments described below, the controller circuit further comprises a non-volatile memory device coupled with the microcontroller. This may be an EEPROM or other suitable, available memory device. The non-volatile memory is operative to store at least the fault indication when present, and upon a restoration of power following a loss of power, the non-volatile memory is operative to restore the fault indication to the microprocessor such that after restoration of power the LED or LCD visible fault indicator continues to provide the appropriate visible fault indication.

When the furnace limit switch is routinely re-setting, and the homeowner is simply cycling power on the furnace, it would be an advantage to be able to detect that pattern of operation, but the prior art safety circuits do not do so. In this invention, when power is cycled off, i.e., if a limit switch is opened, followed by a power cycle, the unit of this invention would maintain a lockout condition, and if this situation is repeated, that could result in a longer, and perhaps permanent lockout, until a furnace repair technician resets the circuit.

The microprocessor is most advantageously programmed to store in the non-volatile memory each occurrence of the actuation of the fault-actuated switch, and also store a value corresponding to associated length of run time from commencement of the turn-on sequence until the associated shut-down sequence. The microprocessor then carries out diagnosis of the stored data, and when it detects a series of fault-actuated switch actuation data stored in the non-volatile memory, accompanied by associated run-time data indicating run times shorter than a predetermined time value, the microprocessor will provide a predetermined annunciation to the visible fault indicator corresponding to the appropriate diagnosis of the stored safety switch actuation data and run time data. The controller may also store time and date of each default, and these can be read out or downloaded.

The invention is not limited to fuel-fired heating equipment, but could be implemented and applied to heat-pump systems, hot-water hydronic units, ground-water-based geothermal heating equipment, resistive electric heating systems, and also to air conditioning systems.

The non-volatile memory can be implemented from an available flash memory module or EPROM.

In embodiments of this invention, the non-volatile memory, e.g., EPROM or EEPROM, stores operational data history of the heating and/or air conditioning system. The microprocessor can make a diagnosis of actual or potential problems and can annunciate the diagnosis as well as the fault type(s). This means that the system needs to be capable of allowing the technician to read these diagnoses, and to clear the faults, and then also to clear the diagnoses at the furnace controller circuit.

The embodiments of this invention provide a pushbutton or key at the controller circuit as a means for the technician to browse through a number of diagnoses that are annunciated on the LED or LCD, and then clear each one. That is, as the technician pushes the button, each successive error message and/or each diagnosis is annunciated, one by one, with a predetermined LED flash code or other message (where it the controller may employ an LCD display).

For example, a first error message may concern the limit switch, with a flash pattern that identifies a fault type. Then, when the pushbutton is pressed, a second message is annunciated, which could indicate recent flame quality, e.g., bad flame. Typically the flash messages are in the form of a series of flashes, i.e., one flash, two flashes, three flashes, etc. However, it is also possible to use a pattern of long and short flashes to indicate a given fault type or a given level of fault.

Then at each message, if the technician holds the button down for some longer period, e.g., five seconds or more, the error message clears. This can be an option, and it is possible the error messages can be cleared through other means, or automatically.

In addition, the system of the present invention makes it possible to analyze safety switch faults based on the data stored on the EEPROM. For example, because the system is able to monitor flame quality over time and collect flame quality data, it is possible also to track the rate of degradation of flame quality, and through an algorithm stored, e.g., in the microprocessor, the system can make timely recommendations to clean the flame rod, replace the flame rod, or take other appropriate steps to restore flame quality. Also, by tracking accumulated run-time of the blower, the system can also recommend actions such as change of air filter, check ducts for obstructions, etc.

According to another aspect of this invention, the microprocessor can be configured to so as to store a history of actuations of the limit switch (or other safety sensor). The microprocessor is operative to establish a lock-out condition to preclude the furnace from effecting its start-up sequence for a period of time depending upon the history of the actuations of the limit switch.

The controller circuit includes a rechargeable DC supply (which can be either a rechargeable storage battery or a large-value capacitor) sufficient to power the microprocessor for a limited period of time. The microprocessor has an input sensitive to the presence or absence of power provided from the AC power source, and the microprocessor is operative, when absence of AC power is detected, to draw power from the rechargeable DC supply. The microprocessor will continue to count clock cycles and measure any remaining lock-out time. Upon restoration of AC power, if the lockout period has expired, the furnace can operate if there is a call for heat. If any lockout time remains, the furnace will not restart until the remaining lockout time has expired. If there is still a call for heat existing when power is restored, the furnace must still wait for any existing lockout time, if any, to pass before starting up.

According to still another aspect of this invention, the furnace controller is operative to adjust the length of the lockout time, when a fault occurs, such as the opening of the limit switch, depending on fault history. As aforesaid, the limit switch or another a fault-actuated safety switch is effective to commence a shut-down sequence of the furnace or other HVAC system when a safety parameter exceeds a predetermined limit value. As also mentioned before, the limit switch or other safety switch automatically resets to permit the turn-on sequence after said shut-down sequence. In this case, the microprocessor establishes a wait time or lockout time L after each opening of the safety switch during a given call for heat or cooling. This wait time L is then the time, after the safety switch resets, that the furnace controller circuit waits before re-initiating a furnace turn-on sequence. The microprocessor measures a time duration T from each initiation of the turn-on sequence until an opening of the safety switch; and the microprocessor calculates said wait time or lockout time L according to an algorithm in which the wait time L is inversely related to the time duration T, such that the wait time L is greater for smaller values of the time duration T; and in which the value of the wait time L is increased for successive openings of the safety switch during a given call for heat or cooling. After a call for heat is satisfied, the initial wait time L is reset to a predetermined initial value (such as L=0). In one preferred example, the microprocessor is programmed to calculate said wait time L according to a formulation $$L = L_{init} \times K + \frac{(T_{max} - T)^2}{T_1}$$

where $L_{init}$ is a previously stored value of the wait time L, K is a positive coefficient smaller than unity, $T_1$ is a highest expected value of the time duration T, and $T_{max}$ is a maximum value of time duration that is greater than $T_1$. In a practical example, K=0.75; $T_1$=4096; and $T_{max}$=4600, where time values are expressed in seconds.

A still further aspect of this invention involves ranking of the types of faults that occur, so that the most significant fault types can be displayed to the repair technician at a service call.

As previously discussed, there is at least one temperature-actuated safety switch effective to commence a shut-down sequence when the temperature of the furnace heat exchanger exceeds a predetermined limit temperature, and which resets to permit the turn-on sequence to resume after that shut-down sequence. The temperature-actuated safety switch is also coupled to an input port of the microprocessor, and the microprocessor is configured to ascertain the presence of a temperature fault based on actuation (i.e., open state) of the temperature-actuated safety switch. In addition, other sensors are present in the furnace, such as a pressure detector and a flame presence detector, each being coupled with a respective input port of the microprocessor, and the microprocessor is configured to ascertain the presence of a pressure fault and a flame presence fault. Also as discussed previously, a pushbutton switch is coupled to one input port of the microprocessor, and an LED or other visible fault indicator is coupled to one of the output ports of the microprocessor. The visible fault indicator is operative to provide a visible fault indication in response to a query executed by pressing said pushbutton switch.

In the arrangement of this invention, the microprocessor is configured to store a history of the occurrences of each temperature fault, each pressure fault, and each flame presence fault, (as well as faults of other fault types). For each occurrence of a fault, the microprocessor stores both the type of fault and the time of occurrence of fault, and then ranks each type of fault according to an algorithm. The time of occurrence can be the particular heating cycle in which the fault occurred. Each type of fault has a predetermined weight factor $W_i$ stored in the microprocessor. The algorithm computes the rank for each fault based on age of the respective fault records for said type of fault and also based on the number of fault records for each type of fault occurrence.

The LED or other visible fault indicator presents the fault messages, e.g., with flash codes, when the service technician presses on the pushbutton switch. These fault messages are presented in order based on the rankings of the types of fault, as computed by the microprocessor according to such algorithm.

Here, the microprocessor increments a counter for each call for heat that is satisfied by the furnace to maintain a count value C for each call for heat, and the microprocessor maintains in its history of occurrences of faults, for each recorded fault occurrence, both the type of fault and the count value C when said fault occurred. In one embodiment, age of each fault occurrence is maintained in terms of furnace cycles, but alternatively elapsed real time could be used.

The foregoing an other features and advantages of this invention will be more fully understood from a consideration of the ensuing detailed description of the invention, which is to be read in connection with the accompanying Drawing figures.

DETAILED DESCRIPTION OF THE PREFERRED EMBODIMENT

Figure 1:
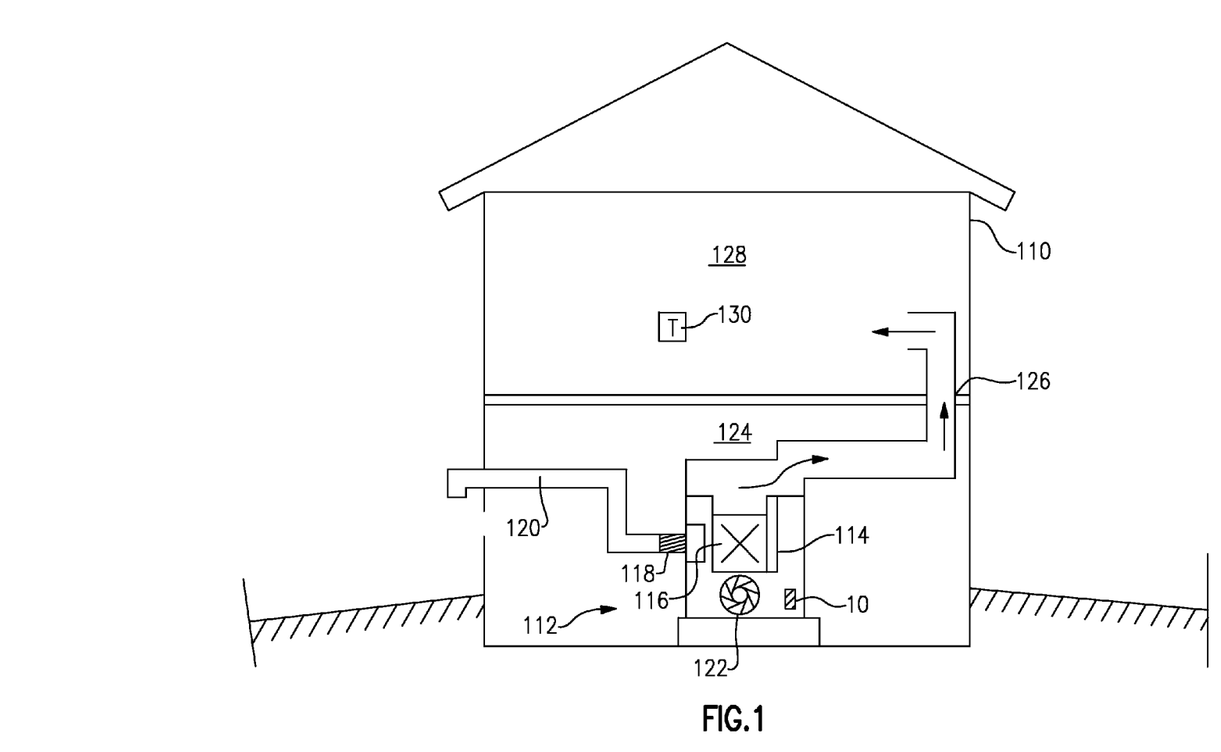
FIG. 1 is a generalized view of a forced air furnace disposed in a dwelling, for explaining the present invention.

With reference now to the Drawing, FIG. 1 illustrates generally a dwelling 110 or similar enclosed building or similar space with a forced air furnace 112 for supplying heated comfort air. The furnace may also include features for supplying refrigerated, conditioned air, controlled humidity, or fan-only air. The furnace 112 has within its enclosure a gas burner 114 which supplies heated combustion air through a combustion air path of a furnace heat exchanger 116 to a inducer fan 118, which in turn forces the combustion air through a discharge vent 120 to the outside. A furnace fan or blower 122 blows returned room air and/or fresh air through a comfort air path in the heat exchanger 116 to a heated air plenum 124. The comfort air picks up heat from the combustion air in the heat exchanger 116. An air supply duct 126 or series of ducts conducts the warmed comfort air from the plenum to a comfort space 128 within the dwelling. A thermostat 130 positioned in the comfort space is connected by thermostat wires (not shown) to a furnace controller 10 disposed within the furnace housing or cabinet. When the temperature within the comfort space 128 falls below a setpoint temperature, the thermostat closes and supplies thermostat power to a terminal in the controller 10 to commence a furnace heating cycle. When the thermostat 130 is satisfied, i.e., when the room temperature in the space 128 is high enough, the thermostat 130 opens, terminating the thermostat power to the terminal of the controller, which causes the furnace to commence a shut-down sequence.

Figure 2:
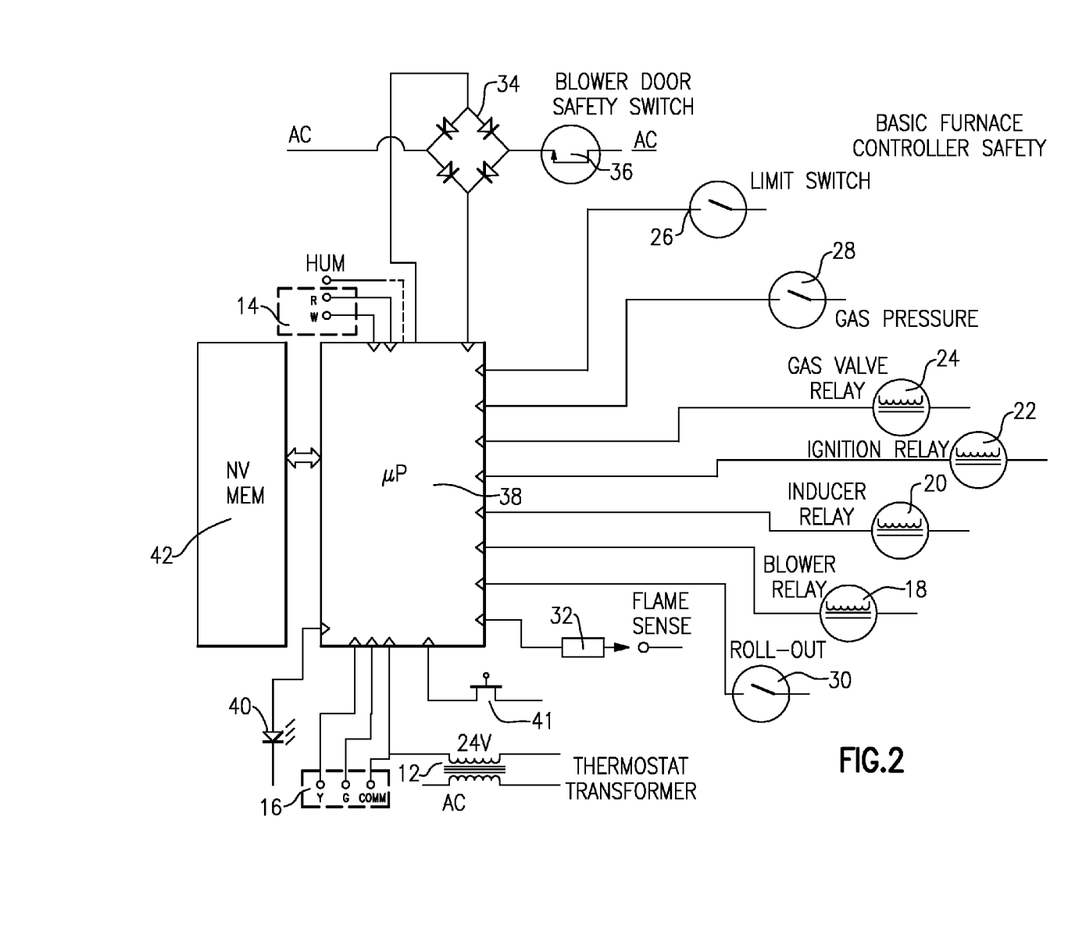
FIG. 2 is a schematic diagram of a furnace control circuit that embodies the improvement of the present invention.

FIG. 2 is a diagram of the furnace control circuit 10. Here a thermostat power transformer secondary 12 supplies 24-volt AC thermostat power through the thermostat 130 to thermostat terminal blocks 14 and 16, which contain R and W terminals for heat and Y and G terminals for air conditioning and blower or fan. There is also a common terminal COM. An optional humidity terminal HUM may also be present for operating a humidifier that may be associated with the furnace.

The furnace control circuit includes a number of relays for turning line power on and off to various furnace components, not shown here. These relays include a blower relay 18, an inducer relay 20, an ignition relay 22, and a gas valve relay 24. Various safety switches are associated with the furnace as well including a temperature limit switch 26. This limit switch 26 is intended to shut down a furnace heat cycle in the event that the furnace heat exchanger exceeds a predetermined temperature limit. There may be two or more such temperature limit switches protecting different stages of the furnace, depending on the furnace design. A gas pressure switch 28 shuts down the furnace in the event the supplied gas pressure is insufficient to support reliable combustion.

Other safety switches are typically provided in a gas-fired forced-air furnace as well. Here, a roll-out switch shuts down the furnace if the flame from the burner "rolls out", e.g., into the exhaust of the heat exchanger, or leaks out into the comfort air flow stream. A flame sensor 32, e.g., a flame rectification flame rod or a photovoltaic sensor, detects presence of flame at the gas burner. The flame rod may also detect the quality of the flame.

A power supply 34 for the control circuit 10 is here represented by a full-wave rectifier having its AC inputs coupled to the main AC power line.

As mentioned earlier, any fuel-fired furnace is required to have a service panel switch or door switch to open and cut off furnace power any time the service access door is opened or removed. In this case a blower door switch 36 is shown connected across the line voltage. If the blower door, or service access door, is opened to access the blower or other furnace components, the power is cut off from the blower, the inducer, and the gas valve. Power to the controller circuit 10 is also lost.

At the heart of the control circuit 10 is a microprocessor or microcontroller 38, which has various inputs and output ports, connected to the various thermostat terminal R, W, Y, G, Comm, to the power supply 34, and to relays 18, 20, 22, 24. Other inputs are connected with the safety switches and sensors, including the limit switch 26, gas pressure switch 28, roll-out switch 30, flame sensor 32, and such other safety switches and sensors as may be present in a given furnace design. The microprocessor 38 has an embedded program for carrying out a start sequence when there is a call for heat, and then carrying out a shut-down sequence when the call for heat is satisfied. That is, when thermostat power is present on terminal R, the microprocessor provides voltages to actuate the inducer relay 20, ignition relay 22, gas valve relay 24, and blower relay 18 in a predetermined sequence at programmed intervals. When the room thermostat is satisfied, the thermostat opens and there is no longer thermostat power at terminal R. When this occurs, the microprocessor 38 de-activates the relays 24, 30, 18 in a preprogrammed shut-off sequence.

If the limit switch 26 is actuated during a heat cycle, e.g., this indicates overheat in the furnace, due to inability of the furnace heat exchanger to transfer combustion heat to the comfort air flow. This may be the result of blockage in the supply air ductwork, or may result from clogged air filter or motor fault in the blower. This typically shuts the furnace off for at least some prescribed period of time, after which the limit switch resets, and if there is a call for heat the furnace controller circuit commences a start sequence.

A visible fault indicator, here, an LED 40 is supplied an intermittent voltage in the event that a furnace fault occurs, e.g., actuation of the limit switch 26. The occurrence of the fault, and the nature of the fault are indicated typically by a sequence of pulsed flashes. For example, a furnace overheat condition, indicated by actuation of the limit switch 26, can be represented by two short flashes, then an off period, and then repetitions of two short flashes followed by an off period. This is continued until the fault is cleared. Different coded flash sequences can indicate other faults, e.g., as reported by the gas pressure switch 28, flame sensor 32, or other sensors. These fault indications continue until the problem has been cleared.

Any loss of power to the furnace, including loss of power due to opening of the blower door or service panel (causing the door safety switch 36 to open), or a loss of AC line power, or loss of power quality due to brown out, will result in the loss of DC power to the microprocessor 38. In that case, any fault condition stored in the microprocessor would also be lost, and when power returns the fault indication LED 40 resets even when the underlying problem has not cleared.

In this embodiment a non-volatile memory unit 42 is coupled with the microprocessor 38, and is adapted to store and retain fault status. In the event of an intermittent power loss, the back-up DC source supplied enough power to the microprocessor 38 to allow it to continue timing of any lock-out period until restoration of power. and the status setting (including also the status of any lock-out period that had not expired at the time of the loss of power) is preserved in the microprocessor.

The ability to store fault status is of course not limited only to actuations of the limit switch 26. The non-volatile memory 42 can store monitored safety limit status of the other safety switches and sensors, and may also store such data as line voltage quality, line voltage amplitude, transformer secondary power quality and amplitude, flame presence, flame quality, gas pressure issues, and a time record of events, such as a time history of limit switch actuations. This makes it possible to monitor for excessive cycling or erratic behavior. And the stored monitoring information will be preserved even after a power interruption of long duration. This status and fault history information can be optionally downloaded, e.g., though an infrared device, and employed by the technician for trouble-shooting. The microprocessor can be calibrated at factory or at installation with data relating to normal heating cycles, i.e., length of time from call for heat until the thermostat is satisfied, and normal frequency of heating cycles. This can be compared with actual history of furnace operating history to identify abnormal cycling patterns.

Some examples of the type of monitoring that are possible with this arrangement include, at least: Limit switch monitoring of more than one limit switch; Roll out switch monitoring; Igniter monitoring; Flame rod monitoring; Blower motor monitoring; Inducer motor monitoring; Gas valve relay response and monitoring; Line voltage monitoring of quality amplitude, and integrity; Transformer secondary monitoring of amplitude/quality and integrity; LSD status indicator(s) maintained in non-volatile memory; Over-temperature limit switch timing; Furnace or furnace component performance monitoring. All of the above may be maintained in respective sectors in the nonvolatile memory 42, to maintain the information on power loss or brownout, and when the appliance service door is opened or removed.

The non-volatile memory 42 can be implemented as an EEPROM or as a removable SD card or other similar flash memory device, which may be removed by the technician for downloading the stored fault information to a trouble-shooting computer.

Figure 3:
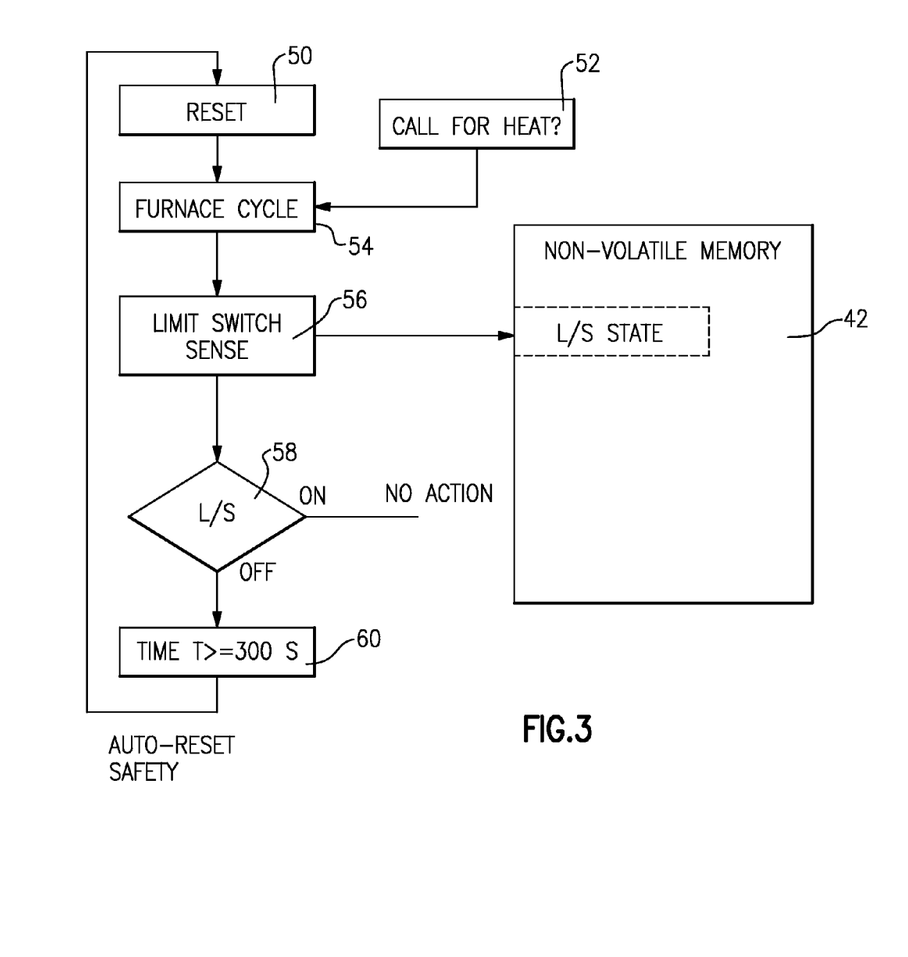
FIGS. 3 and 4 are logic flow diagrams for explaining the one aspect of the invention.

Furnace operation can be explained with reference to the flow chart of FIG. 3. Initially, when there is no call for heat, it is assumed that the limit switch 26 is in its normal or reset state, indicated at box 50. If the thermostat sends a call for heat, indicated at box 52, the furnace controller circuit will conduct a turn-on sequence to commence a furnace heating cycle, indicated at box 54. During this time, the status of limit switch 26 is monitored, and the status is stored in a memory location in the non-volatile memory 42, as indicated in box 56. If the status of the limit switch 26 is ON (here, the limit switch is assumed to be a normally-closed switch), the furnace continues to function normally, as indicated in box 58. However, if the limit switch status is OFF, indicating an overheat condition, the furnace shuts down, and a timer functionality in the microprocessor is started, as indicated in box 60. This timer counts to predetermined value, here corresponding to 300 seconds or five minutes, and then automatically resets the limit switch (box 50). When there is a call for heat, the furnace will again cycle on, and the limit switch 26 is again monitored as to its status. The memory 42 may optionally store each occurrence of a detected overheat condition, together with the time of occurrence (the time of occurrence may be in terms of furnace cycles). The microprocessor can inspect this stored data and may analyze it for patterns of unusual cycling, and may provide a predetermined alert indication (e.g., using the LED 40) to call technician's attention to this.

Figure 4:
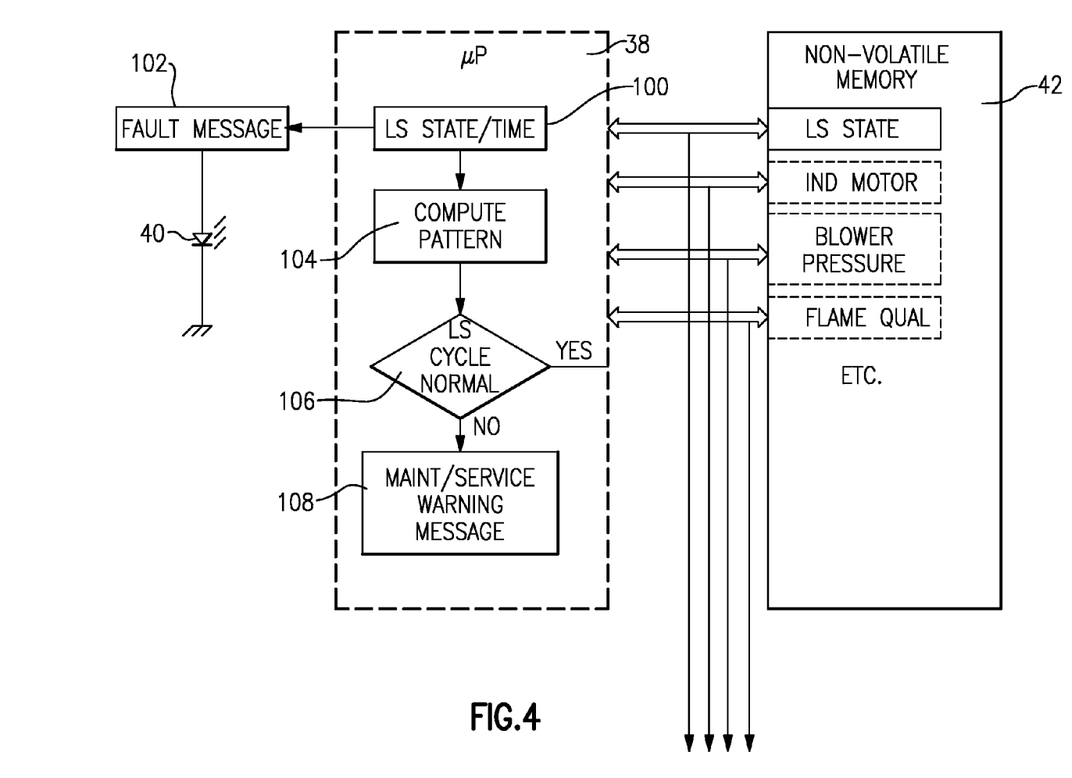

FIG. 4 is a logic diagram that explains the detection of unusual cycling patterns, employing the arrangement of the present invention. Here microprocessor 38 is continuously monitoring limit switch status (box 100), and when a limit switch actuation occurs, the microprocessor generates a fault message (box 102) and commences flashing the LED 40. The limit switch status and the time of status are transferred to a memory location in the non-volatile memory 42. These stored data are available to the microprocessor, and the latter may be programmed to compute patterns of limit switch actuation (box 104) and compare them with stored values to determine whether the patterns of operation are normal or not normal (box 106). If these patterns of limit switch operation are found to be abnormal, then a maintenance/service warning message may be generated (box 108). This can result in a predetermined pattern of flashes on the fault indicator LED 40, or may involve transmitting data to a remote alert station, e.g., on the wall thermostat or via Internet to an off-site maintenance facility. A scroll/reset key 41 allows the technician to scroll or browse through the various fault indications and reset the warning(s), e.g. by holding the key 41 down for ten seconds or more.

As also shown in FIG. 4, status of other components, e.g., inducer motor, blower pressure, flame quality, etc., can be monitored and the status stored in respective memory locations in the non-volatile memory 42. In the event of power loss, the status remains stored in the microprocessor 38, thanks to the backup DC power supply. 4

A rechargeable DC supply can be incorporated into the controller circuit 10, and can allow the processor to remain operational after the 24-volt thermostat power has been turned off. This can be implemented as a DC rechargeable battery, or as a storage capacitor or super-cap. A super-cap or battery can allow the processor to remain operational after the 24-volt AC power has been interrupted or lost. The time of limit switch or flame sense failure (kept in terms of seconds or in terms of furnace cycles) is recorded. That is, a rechargeable battery or DC power supply in the control circuit can enable the microprocessor to maintain a failure history. This way, the lockout time can be maintained, to ensure that lockout periods are met. Also, the time of each fault may be recorded and stored in memory.

A smaller capacitor can be used to supply power at times of power interruption for enough time to keep the microprocessor running after the 24 volt AC power is gone. Back up power to the microprocessor should be maintained for at least a safe lock-out time for safety purposes. The non-volatile memory also stores the lock-out information, if a lock-out exists.

According to another aspect of this invention, the furnace controller employs a software algorithm for furnace self-diagnosis of faults, and displays the faults in the order of significance, as determined by the microprocessor 38. In this case, the non-volatile memory 42 can be an EEPROM that stores furnace operating data as explained below. The microprocessor 38 includes an integral up-counter that records the total number of heating (or if appropriate, cooling) cycles C that have occurred since the last time the counter had been reset, and each time the furnace completes a heating cycle, the counter increments (to C+1). At factory calibration the counter is initially reset to C=0, and then after a service call the service technician can also reset the counter to C=0. The EEPROM stores fault records, e.g., $FT_{\{1\}}$, $FT_{\{2\}}$, $FT_{\{3\}}$ ... $FT_{\{n\}}$ of each type of furnace fault. For example, $FT_{\{1\}}$ may be a gas valve fault, $FT_{\{2\}}$ may be a limit switch fault, $FT_{\{3\}}$ may be a flame sense fault, $FT_{\{4\}}$ may be a pressure switch fault, and $FT_{\{5\}}$ may be a brownout (mains voltage) fault. Each fault condition is recorded as a fault record as it occurs and stored in the EEPROM. An example of stored fault records is shown in the following Table 1, and the current value of the heating cycle counter ($HC_{\{i\}}$) when the fault occurs is also stored as part of the fault record, as also shown in the example of Table 1. The number $HC_{\{i\}}$ is an integer that represents the number of heating cycles that had occurred (since the counter being reset to zero) at the time the fault occurs, and is the current value of the count C, described above, when the fault is detected. The index {I} represents the sequence order of the detected fault:

TABLE 1

| Fault Type ($FT_{\{n\}}$) | Heating Cycles ($HC_{\{i\}}$) |
|---|---|
| 2 | 46 |
| 1 | 182 |
| 5 | 201 |
| 2 | 563 |
| ... | ... |

Here $FT_{\{n\}}$ is stored as an integer to identity the type of fault, with a value as predefined, in this example, in Table 2. Table 2 also includes the weight $FW_{\{n\}}$ assigned to each type of fault, and an a blink code $B_{\{n\}}$ assigned for each fault type. Here the blink code is a number of short flashes followed by a blank period, after which the code repeats.

TABLE 2

| Fault Type ($FT_{\{n\}}$) | Description | Weight ($FW_{\{n\}}$) | LED Blink Code ($B_{\{n\}}$) |
|---|---|---|---|
| 1 | Gas Valve Relay Fault | 8192 | 1 |
| 2 | Limit Switch Fault | 4864 | 3 |
| 3 | Flame Sense Fault | 2688 | 2 |
| 4 | Pressure Switch Fault | 4096 | 4 |
| 5 | Brownout Fault | 2048 | 5 |

All fault records are erased at factory calibration, and when the operator or technician clears the fault history in the EEPROM.

Figure 5:
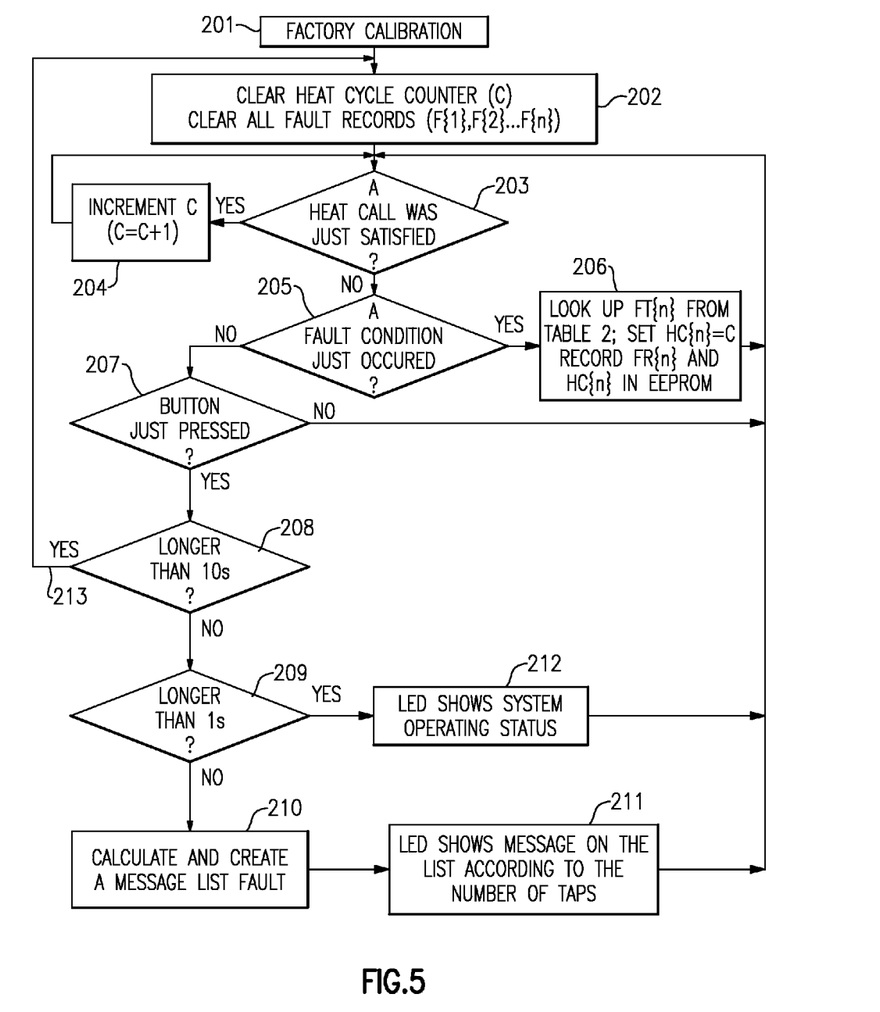
FIG. 5 is a logic flow diagram for explaining a furnace self-diagnostic procedure according to the invention.

The algorithm carried out by the microprocessor to rank the recorded faults can be explained with reference to FIG. 5.

At factory calibration (201), or when the technician clears fault history, all fault records $F_{\{1\}}$ to $F_{\{5\}}$ are erased, and the heating cycle counter C is set to C=0 (step 202). The microprocessor 38 continuously monitors the thermostat 130 (step 203), and each time a call for heating W has been satisfied, the counter C is incremented to C=C+1 (step 204). During any given heating cycle, when a fault condition occurs (step 205), the appropriate fault type code $FT_{\{n\}}$ is taken from a look-up table (e.g., Table 2), and this is combined with the current heat cycle value C and stored as value $HC_{\{i\}}$ together with the fault type code $FT_{\{n\}}$ as a fault record (step 206) in the fault history of the EEPROM. That is, when a furnace fault occurs, the microprocessor records the fault type $FT_{\{n\}}$ and loads the current heating cycle counter C as value $HC_{\{i\}}$=C into same fault record in the fault history. Each time a call for heating W is satisfied the value C increments again, and each time another fault occurs a record is added to the fault history including the respective fault type code $FT_{\{n\}}$ and furnace cycle count $HC_{\{i\}}$.

When a furnace service technician makes a service call, he or she can query the fault status by depressing the push button 41 (step 207). As long as the push button actuation is a short tap, i.e. a tap below about one second, (skipping over steps 208 and 209), the microprocessor will respond by calculating and creating a message list, which presents fault messages as fault types in order, ranked by significance of the various types of faults. The LED display, i.e., LED 40, will flash fault messages according to the number of taps the service technician gives the pushbutton 41 (step 211). In this example, one tap produces the fault code for the most significant fault type, two taps produces the fault code for the second most significant fault type, and so on. The service technician can then inspect the furnace and the heating system to identify the sources for the faults.

If the pushbutton 41 is then depressed for a time greater than about one second, but less than about ten seconds (step 209), the LED 40 will display current operating status (step 212). If the pushbutton 41 is held down for a longer period, e.g., over ten seconds, (see step 208 and step 213), then the microprocessor clears all the fault records and clears the cycle counter, i.e. resetting it to C=0 (step 202).

The process of ranking each fault type from the fault history is carried out generally as explained, with reference to Equations 1 and 2. First each the fault recorded in each fault record is given a weight Wi according to Equation 1:

$$W_i = FW_{\{n\}} \times (C - HC_{\{i\}})^{-1} \qquad \text{(Equation 1)}$$

Here the index I is used to indicate the particular fault records in the order they are stored chronologically, with I=1 being the oldest and I=N being the most recent of a total of N records. The fault weights $FW_{\{n\}}$ are taken from the values in Table 2 above.

Then for each of the fault types FT{n} for which there are stored fault records, the weights $W_i$ each specific type of fault $FT_{\{n\}}$, i.e., $W_{i\{n\}}$, are summed, per equation 2:

$$S_{\{n\}} = \Sigma W_{i\{n\}} \qquad \text{(Equation 2)}$$

Then the list of fault types $FT_{\{1\}}$, $FT_{\{2\}}$ ... $FT_{\{5\}}$ are sorted according to the summed weight $S_{\{n\}}$ as computed in Equation 2, and are ranked in descending order. This yields the diagnostics message list.

At this point when the technician taps the pushbutton one time, the first message, i.e., concerning the highest ranked fault type $FT_{\{n\}}$, will appear as a flash code or blink code $B_{\{n\}}$, as given in Table 2. This alerts the technician to the type of fault that requires priority attention. Then tapping the pushbutton twice will produce the second message, which here is the blink code $B_{\{n\}}$ for the next most urgent fault type. Tapping the push button three, four or five times will produce blind codes for any remaining fault types $FT_{\{n\}}$ for which there are fault records. If there are no fault records stored for any given fault type, then tapping the push button to that point, i.e., three, four or five times, will not yield any blink codes, thus indicating there are no further fault messages on the list.

The technician can continue to query the fault history, i.e., again tapping the pushbutton one time to produce the first fault message again.

The technician can hold the pushbutton down for a predetermined time, i.e. greater than one second but less than ten seconds, so that the LED will blink the code that indicates the current operating status of the furnace. Also, after a predetermined period of inactivity, e.g., a few minutes, the LED 40 will revert to blinking the current operating status. When the service call is finished, the technician can hold down the push button 41 for a longer predetermined time, e.g., longer than ten seconds, to reset the cycle counter and erase the fault records from memory.

Figure 6:
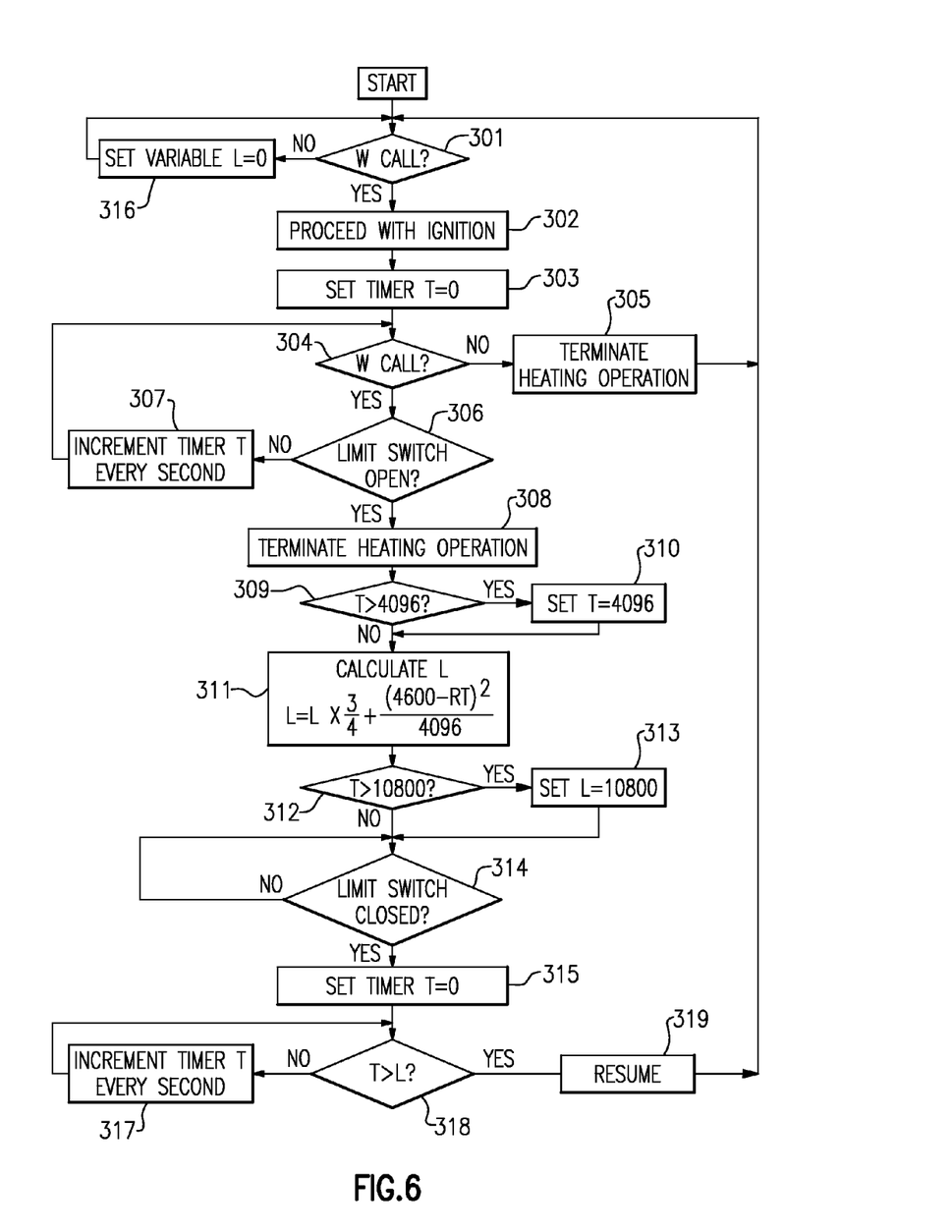
FIG. 6 is a logic flow diagram for explaining variably setting a lock out time L, according to an embodiment of the invention.

FIG. 6 illustrates one implementation of the process in which the furnace control circuit determines a lockout time when a resettable safety switch, e.g., limit switch 26 opens, e.g., in response to an overheat condition in the furnace heat exchanger. In this example, the microprocessor 38 executes an algorithm to establish a lockout time L, whose duration is based on how long the furnace had been operating before the limit switch opened, and how frequently the limit switch had opened during a given call for heat. A longer furnace run time before an overheat fault occurred would not require a long lockout time, but a short run time from commencement of a heat cycled until the fault occurred may require a much longer lockout time. Also more frequent faults would also require a longer lockout time. Here, the temperature limit switch is used to explain the general principles, but this arrangement can respond to other safety switches or sensors.

The furnace controller is constantly monitoring the thermostat and initiates a start-up sequence whenever there is a call for heat. The microprocessor 38 is also sensitive to whether there is a call for heat, and whether the temperature limit switch 26 (or another safety switch) has been opened. The microprocessor stores a lockout time variable L, which is computed as discussed below, and also has a timer that increments each second after the limit switch 26 opens, and these values are used to compute the lockout value.

Initially, the furnace controller monitors for a call for heat (step 301), and if there is no call for heat, the lockout variable L is initialized and set to zero (step 302). When a call for heat is present (step 303), the controller initiates an ignition sequence and the furnace operates to furnish heat to the associated comfort space. At this time, the microprocessor timer functionality sets the time variable T to zero (step 316). The furnace controller continues to monitor the thermostat's call for heat (step 304), and when the thermostat is satisfied, the call for heat ends and a the furnace goes through a normal shut-down and terminates the heating operation (step 305). The furnace controller continues to monitor the wall thermostat for a call for heat (step 301) and the furnace operates normally.

During each furnace operation, as long as there is a call for heat, the furnace controller monitors the limit switch (step 306). As long as the limit switch 26 remains closed, the timer counts upwards, incrementing the value of T once per second (step 307). However, if the limit switch opens, the controller initiates a shut-down sequence to terminate the heating operation (step 308), and the lockout variable L is computed. The time variable T is recorded, and if the actual value of T exceeds a predetermined maximum, e.g., T≥4096 (step 309), then the variable T is set to 4096 (step 310). Otherwise, the actual time variable T as it exists on the timer is used.

A new value of the lockout variable L is computed (step 311), based on the stored value of L, and taking into account the furnace run time T from the time the heating cycle started until the limit switch fault occurred. Favorably, this new value for the lockout variable L is computed using Equation 1 (although a somewhat different equation may be appropriate for different types of HVAC equipment).

$$L = L_{init} \times K + \frac{(T_{max} - T)^2}{T_1} \quad \text{\{Equation 3\}}$$

where $L_{init}$ is the previously stored value of the lockout variable L, K is a constant coefficient smaller than unity, $T_1$ is a highest expected value of the time duration T, and $T_{max}$ is a predetermined maximum value of time duration that is greater than $T_1$. In one practical implementation, these values may be K=0.75; $T_1$=4096; and $T_{max}$=4600, so that equation 1 becomes:

$$L = L_{init} \times 0.75 + \frac{(4600 - T)^2}{4096}$$

Note that the first stored value of $L_{init}$ is L=0, but for any subsequent faults during a given call for heat, the previously computed value of L becomes the new value for $L_{init}$. Also for large values of time T, the computed value of the right hand expression, $$\frac{(4600 - T)^2}{4096}$$

is going to be a small number, while on the other hand for small values of time T from one fault to the next, the right hand expression is going to yield a much larger number. However, as it is desirable to limit the maximum lockout time to about three hours, i.e., 10,800 seconds, when the computed value of the lockout variable L is greater than 10800 (step 312) the microcontroller substitutes L=10800 (step 313). The values of L, $L_{init}$, T, $T_1$ and $T_{max}$ are in seconds in this example.

The furnace controller continues to monitor the status of the limit switch 26 (step 314), and when the limit switch resets to its closed condition, the timer functionality resets to T=0 (step 315), and the time counts up, i.e., increments once per second (step 317). When the timer value T reaches or exceeds a lockout duration equal to the stored lockout variable L, (step 318), the furnace controller can again look at the wall thermostat (step 319) and as long as there is a continuing call for heat (step 301), the furnace controller will commence another ignition sequence (302). This again resets the timer (step 316).

With this procedure, if the cause for the temperature fault was short term or intermittent (such as a short wind burst), the lockout time L will be short, and the interruption of the supply of heated air will be kept as short as possible. On the other hand, if there is a persistent cause for the limit switch fault (such as clogged air filter, blower problem, or blocked flue), the lockout time will automatically increase as long as the fault continues, and will provide sufficient lockout time for the furnace heat exchanger to cool between attempts to resume operations.

The principles discussed here in connection with forced air heating can be employed to advantage also with central air conditioning. Also, there may be associated geothermal heating or cooling employed in combination with the fuel-fired forced air heating, or in some cases a heat pump system, and their operations can be tracked and controlled, and a fault history stored in other implementations of this invention.

While the invention has been described with reference to specific preferred embodiments, the invention is certainly not limited to the precise embodiments as illustrated here. Rather, many modifications and variations will become apparent to persons of skill in the art without departure from the scope and spirit of this invention, as defined in the appended claims.

We claim:

1. In a fuel-fed furnace of the type which comprises
a burner supplied with fuel and which produces a flame;
a heat exchanger in which the flame passes through a combustion air path of a heat exchanger to an exhaust;
a blower which forces a flow or return air from a comfort space through a comfort air path of said heat exchanger, and thence through a ductwork to supply heated air to said comfort space;
a source of AC power;
a controller circuit coupled to said source of AC power and which controllably actuates said burner and said blower to effect a turn-on sequence in response to a call for heat from an associated thermostat, and to effect a shut down sequence when said call for heat is satisfied, said controller circuit including a microcontroller having a plurality of input ports and a plurality of output ports including ports to issue control signals for actuation of said burner and for said blower, said controller circuit further including a non-volatile memory device coupled with said microcontroller and operative to store a fault indication when present;
at least one temperature actuated limit switch effective to commence said shut-down sequence when the temperature of said heat exchanger exceeds a predetermined limit temperature, and which resets to permit said turn-on sequence after said shut-down sequence;
the improvement wherein
said microcontroller is configured to so as to store a history of actuations of said limit switch; and wherein said microcontroller is operative upon an actuation of said limit switch to establish a lock-out condition to preclude said furnace from effecting said start-up sequence for a period of time depending upon a stored history of actuations of said limit switch; said microcontroller being operative to monitor time remaining in said period of time of said lock-out condition; said microcontroller being suitably programmed to process the stored history of actuations of the limit switch; wherein
said controller circuit includes a rechargeable DC supply, sufficient to power said microprocessor for a limited period of time in an absence of power provided from said source of AC power; and wherein
said microcontroller is operative, when absence of AC power occurs, to continue to monitor time remaining in the period of time of the lock-out condition; and upon restoration of power to said source of AC power, if time remains in said period of time of the lock-out condition, to continue said lock-out condition until the time that remains in said period of time thereof has expired.

2. In HVAC equipment of the type which comprises
a source of a heated or chilled medium;
a heat exchanger in which the heated or chilled medium passes;
a blower forces a flow of return air from a comfort space through a comfort air path of said heat exchanger, and thence through a ductwork to supply heated or chilled air to said comfort space;
a controller circuit coupled to a source of AC power and which controllably actuates said source of heated or chilled medium and said blower to effect a turn-on sequence in response to a call for heat or cooling from an associated thermostat, and to effect a shut down sequence when said call for heat or cooling is satisfied, said controller circuit including a microprocessor having a plurality of input ports and a plurality of output ports including ports to issue control signals for actuation of said source of heated or chilled medium and for said blower;
a fault-actuated safety switch effective to commence said shut-down sequence when a safety parameter in said HVAC equipment exceeds a predetermined limit value, and which resets to permit said turn-on sequence after said shut-down sequence;
and a visible fault indicator coupled to one of the outputs of said microprocessor and operative to provide a visible fault indication in response to actuation of said safety switch;
the improvement wherein said microprocessor establishes a wait time L after each opening of the safety switch during a given call for heat or cooling, in which after the safety switch resets the controller circuit waits for a time period equal to said wait time L to expire before re-initiating said turn-on sequence; wherein the microprocessor measures a time duration T from each initiation of the turn-on sequence until an opening of said safety switch; and the microprocessor calculates said wait time L according to an algorithm in which the wait time L is inversely related to the time duration T, such that the wait time L is greater for smaller values of the time duration T; and in which the value of the wait time L is increased for successive openings of the safety switch during a given call for heat or cooling.

3. The HVAC equipment according to claim 2 wherein said microprocessor is suitably programmed to set the wait time L to a predetermined initial value when a call for heat is not present.

4. The HVAC equipment according to claim 3 wherein said microprocessor sets said initial value as L=0.

5. The HVAC equipment according to claim 2 wherein said microprocessor is programmed to calculate said wait time L according to a formulation $$L = L_{init} \times K + \frac{(T_{max} - T)^2}{T_1}$$

where $L_{init}$ is a previously stored value of the wait time L, K is a coefficient smaller than unity, $T_1$ is a highest expected value of the time duration T, and $T_{max}$ is a maximum value of time duration that is greater than $T_1$.

6. The HVAC equipment according to claim 5 wherein K=0.75; $T_1$=4096; and $T_{max}$=4600, all in time units of seconds.

7. In a fuel-fed furnace of the type which comprises
a burner supplied with fuel and which produces a flame;
a heat exchanger in which the flame passes through a combustion air path of a heat exchanger to an exhaust;
a blower which forces a flow of return air from a comfort space through a comfort air path of said heat exchanger, and thence through a ductwork to supply heated air to said comfort space;
a controller circuit which controllably actuates said burner and said blower to effect a turn-on sequence in response to a call for heat from an associated thermostat, and to effect a shut down sequence when said call for heat is satisfied, said controller circuit including a microprocessor having a plurality of input ports and a plurality of output ports including ports to issue control signals for actuation of said burner and for actuation of said blower, said controller circuit further including a non-volatile memory device coupled with said microprocessor and operative to store a fault indication when present;

at least one temperature-actuated safety switch effective to commence said shut-down sequence when the temperature of said heat exchanger exceeds a predetermined limit temperature, and which resets to permit said turn-on sequence after said shut-down sequence, the temperature-actuated safety switch being coupled to an input port of said microprocessor, and the latter being configured to ascertain the presence of a temperature fault based on actuation of said temperature-actuated safety switch;

further comprising a pressure detector and a flame presence detector, each coupled with a respective input port of said microprocessor, the latter being configured to ascertain the presence of a pressure fault and a flame presence fault, a pushbutton switch coupled to an input port of the microprocessor;

a visible fault indicator coupled to one of the output ports of said microprocessor and operative to provide a visible fault message in response to a query executed by pressing said pushbutton switch; and the improvement wherein said microprocessor is configured to store a history of the occurrences of each of said temperature fault, said pressure fault, and said flame presence fault, including, for each said occurrence, type of fault and time of occurrence of fault, and to rank each type of fault according to an algorithm, in which each type of fault has a predetermined weight factor W stored in said microprocessor, and with said algorithm computing the rank for each fault based on age of the respective fault records for said type of fault and also based on the number of said fault records for each said type of fault occurrence; and said visible fault indicator presenting said fault messages upon an actuation of said pushbutton switch, in an order based on the rankings of said types of fault and as computed by said microprocessor according to said algorithm.

8. The fuel-fed furnace according to claim 7, wherein each of said types of fault has a different value for its associated predetermined weight factor.

9. The fuel-fed furnace according to claim 7, wherein said microprocessor increments a counter for each call for heat satisfied by said furnace to maintain a count value for each call for heat, and the microprocessor maintains said history of occurrences of said faults, for each fault the type of fault and the count value when said fault occurred, such that the ages of occurrences of faults are maintained in terms of furnace cycles.

10. In a fuel-fed furnace of the type which comprises:
a burner supplied with fuel and which produces a flame;
a heat exchanger in which the flame passes through a combustion air path of a heat exchanger to an exhaust;
a blower which forces a flow of return air from a comfort space through a comfort air path of said heat exchanger, and thence through ductwork to supply heated air to said comfort space;
a controller circuit coupled to said burner and said blower, and including a microcontroller having a plurality of input ports and a plurality of output ports, and a memory device capable of storing a plurality of fault occurrences of a plurality of fault types, when present;
a plurality of fault sensors operatively coupled to at least said burner, said heat exchanger, and said blower to report a respective fault type when the operating performance of the associated one of said burner, said heat exchanger, and said blower is outside a respective limit, said fault sensors each being coupled to a respective one of the input ports of said microcontroller;
a push button coupled to one input port of said microcontroller and capable of signalling said microcontroller each time the push button is tapped;
a visible fault indicator being coupled to an output port of said microcontroller and being operative to display a message according to each given fault type, when present, in response to a predetermined pattern of taps on said push button.

11. The fuel fed furnace according to claim 10, wherein the fault message for each fault type is displayed in response to a different respective pattern of taps.

12. The fuel fed furnace according to claim 10, wherein the fault message for each fault type is displayed in sequence according to a computed priority of the fault types.

13. The fuel fed furnace according to claim 10, wherein the microcontroller is operative to reset the memory device that is capable of storing a plurality of fault occurrences of a plurality of fault types in response to said push button being actuated for at least a predetermined length of time.

14. The fuel fed furnace according to claim 13, wherein a tap is effected by actuating said push button for a period of less than one second, and said the resetting of said memory device is effected by actuating said push button for said predetermined length of time of more than one second.

* * * * *